United States Patent [19]

Kondo

[11] Patent Number: 4,947,249

[45] Date of Patent: Aug. 7, 1990

[54] APPARATUS IN WHICH SUBSAMPLING AND BLOCK CODING ARE BOTH EMPLOYED FOR CODING DIGITAL VIDEO DATA

[75] Inventor: Tetsujiro Kondo, Kanagawa, Japan

[73] Assignee: Sony Corporation, Tokyo, Japan

[21] Appl. No.: 414,515

[22] Filed: Sep. 29, 1989

[30] Foreign Application Priority Data

| Oct. 14, 1988 [JP] | Japan | 63-259141 |
| Oct. 25, 1988 [JP] | Japan | 63-268894 |
| Oct. 28, 1988 [JP] | Japan | 63-272298 |

[51] Int. Cl.⁵ .............................................. H04N 7/12
[52] U.S. Cl. ..................................... 358/135; 358/136
[58] Field of Search ............... 358/138, 133, 135, 136

[56] References Cited

U.S. PATENT DOCUMENTS

| 4,442,454 | 4/1984 | Powell | 358/167 |
| 4,734,768 | 3/1988 | Pexa | 358/135 |

Primary Examiner—James J. Groody
Assistant Examiner—Victor R. Kostak
Attorney, Agent, or Firm—Alvin Sinderbrand

[57] ABSTRACT

An apparatus for coding digital video data represented by respective picture element data determines at least one elementary picture element for each block and predicts values of respective picture element data, whereupon predictive errors are detected from the difference between such predictive values and the real values of the respective picture element data. If the detected predictive errors is greater than a threshold value, flag data are generated and the elementary picture element data and the subject picture element data are gated, and maximum and minimum gated values are detected for each block as the basis for respective dynamic range information. Modified digital video data are generated for each block as the difference between the gated output data and one of the maximum and minimum gated values for the respective block, whereupon, the modified digital video data are encoded with a variable digitized bit number determined by the flag data for the respective block so as to provide coded data of variaable bit length to be transmitted with the flag data.

5 Claims, 8 Drawing Sheets

APPARATUS IN WHICH SUBSAMPLING AND BLOCK CODING ARE BOTH EMPLOYED FOR CODING DIGITAL VIDEO DATA

BACKGROUND OF THE INVENTION

1. Field of the Invention

This invention relates to a highly efficient coding apparatus for a picture signal, such as a television signal, and, more particularly, is directed to a coding apparatus in which a subsampling and a block coding, such as a coding adaptive to a dynamic range or ADRC, are both employed.

2. Description of the Prior Art

In the transmission of a digital video signal, subsampling is a known method for compressing an amount of data, as compared with the original amount, and is the thinning-out of picture elements through subsampling by lowering the subsampling frequency. One proposed subsampling method for thinning-out picture data to ½, is to transmit a two-bit flag, indicating the position of a subsampling point, and that subsampling point is used in the decoding at the time of interpolation of thinned-out picture elements. For example, if the picture element data of a digital video signal is eight bits and a two-bit flag is added, then the bit number per picture element becomes five bits and the compression rate is (⅝).

Since a subsampling pattern, for instance a line-quincunx, is always fixed in this conventional subsampling, there is the problem that the quality of a reproduced picture is substantially deteriorated in a portion of a contour of an object in the picture. Particularly, when the subsampling period is lengthened more than ½, the deterioration of the picture quality is substantial.

To solve the above-mentioned problem, the present applicant has proposed an encoding method as described in the specification of the Japanese Patent Laid Open Publication (JP, A) No. 266924/1987. In this method, a picture is divided into a number of two-dimensional blocks, the difference (dynamic range) between the maximum value and the minimum value of plural picture element data in the block is obtained, and the period of the subsampling is varied in dependence on the dynamic range of the blocks. More specifically, if a block has a small dynamic range, it is deemed to represent a planar picture, and the subsampling period is increased, for example to (⅛). On the other hand, if a block has a comparatively large dynamic range, it is deemed to represent a changing picture, and the subsampling period is reduced to (½). Further, if a block has an extremely large dynamic range, then it is deemed to represent a substantially changing picture, and no subsampling is applied.

Since the subsampling period is set on the basis of the block as a unit, in a highly efficient coding apparatus, the switching of the subsampling frequency is selectively dependent on a dynamic range, as described above. The picture quality of a reproduced picture, whether it is good or poor, necessarily occurs at a unit of block and, for this reason, substantial block distortion appears. Further, the dynamic ranges of blocks to be selected as subsampling periods are limited, so that the adaptability of the subsampling period to a characteristic of a picture may be insufficient.

The present applicant has further proposed a highly efficient coding apparatus for a picture signal which does not cause the above described deterioration of the block unit and which can form a subsampling pattern having a variable density adaptive to a characteristic of a picture so as to provide excellent picture reproduction (for example, as disclosed in the specification of the Japanese Patent Application No. 208957/1987).

Another highly efficient coding apparatus for a picture signal which has the same advantage as the invention disclosed in said specification of the immediately above identified Japanese Patent Application and which uses real data at the time of calculation of interpolation errors to enable real-time processing and to be applicable to an animation, has been proposed by the present applicant (for example, in the specification of the Japanese Patent Application No. 85210/1987).

In the above-proposed variable density subsampling, since the thinning-out process is performed adaptively, the generated data amount varies greatly depending on the degree of correlation of a picture. As a consequence, problems may arise in that the transmission data amount may not exceed a predetermined required minimum value or by reason of the fact that it is applied to a transmission path (for example, a digital VTR) which requires an almost constant data rate. Further, in the case of a small transmission capacity, the reduction of the amount of data only by subsampling may not be sufficient.

OBJECTS AND SUMMARY OF THE INVENTION

It is, therefore, an object of the present invention to provide a highly efficient coding apparatus for video data, which is capable of solving the known problems mentioned above.

In particular, a principal object of the present invention is to provide an improved highly efficient coding apparatus, which can attain a high compression ratio by employing the compression in a level direction.

Another object of the present invention is to provide a highly efficient coding apparatus which can minimize the quality deterioration of the reproduced image.

A further object of the present invention is to provide a highly efficient coding apparatus which can maintain the amount of transmitted data in a block to be substantially fixed.

Still another object of the present invention is to provide a highly efficient coding apparatus which requires only a small capacity buffer memory.

According to an aspect of the present invention, a highly efficient coding apparatus for coding digital video data in a format composed of blocks of digital video data representing plural picture elements and allowing compression of the video data, comprises:

means for receiving the digital video data represented by respective picture element data of a predetermined number of bits, means for determining at least one elementary picture element for each of the blocks, means for predicting values of respective subject picture element data, means for detecting predictive errors of the predicted values relative to the real values of the picture element data, means for comparing each predictive error with a threshold value, means for generating flag data in response to the comparison of the predictive error with the threshold value, means for gating the elementary picture element data and the subject picture element data for which the respective predictive errors are greater than the threshold value, detecting means for detecting maximum and minimum values of the output of the gating means in each of the blocks, means for generating dynamic range information for each block from the maximum and minimum values for the respective block, means for generating modified digital video data for each block as the difference between the output data of the gating means and one of the maximum and minimum values for the respective block, means for encoding the modified digital video data with a variable digitization bit number determined by the flag data for the respective block so as to provide coded data of variable bit length, with the result that the data amount of the coded data for each the respective block can be maintained substantially constant, and transmitting means for transmitting at least the coded data and the flag data.

The above, and other, objects, features and advantages of the present invention, will become readily apparent from the following detailed description thereof which is to be read in connection with the accompanying drawings.

DETAILED DESCRIPTION OF THE PREFERRED EMBODIMENTS

Figure 1:
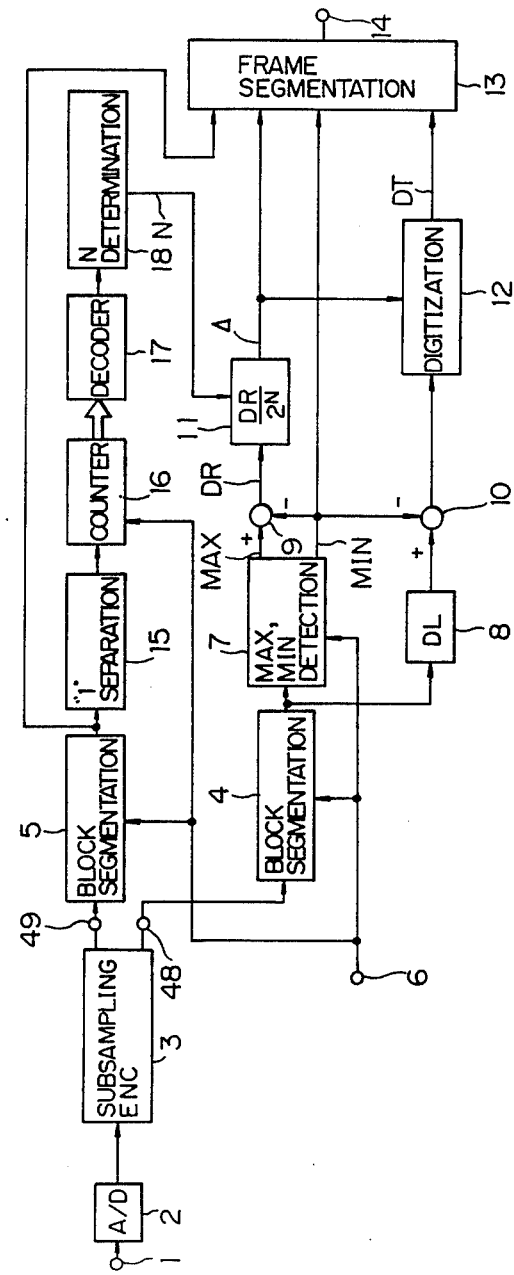
FIG. 1 is a block diagram of a first embodiment of the present invention.

A first embodiment of the present invention will now be described with reference to FIG. 1, in which a picture signal, for instance, a video signal is supplied to an input terminal 1. The video signal is converted into a digital video signal by an A/D converter 2. The digital video signal has a sampling frequency of 13.5 MHz, for example, and the data representing each picture element has eight bits.

The digital video signal is supplied to a subsampling encoder 3. As will be described later, data of a picture element to be transmitted is generated at an output terminal 48 of the subsampling encoder 3 after the thinning-out process, and a control code is generated at an output terminal 49. Whether a picture element is thinned-out or transmitted is indicated by the control code.

Figure 2:
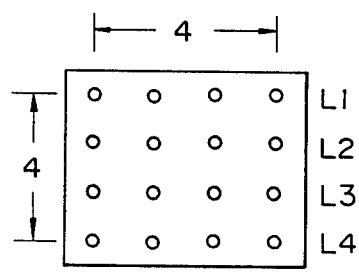
FIG. 2 is a schematic diagram for explaining a block which is a unit for a coding process.

An ADRC encoder is provided on the output side of the subsampling encoder 3, and encoding is made to be adaptive to a dynamic range DR of each two-dimensional block, for example. With the segmentation of one frame, a block of (4×4=16) picture elements is formed as shown in FIG. 2. It should be noted that there is not always data of 16 picture elements at this stage, since the picture element data supplied from the output terminal 48 of the subsampling encoder 3 has been subjected to the predetermined thinning-out process. A digitization bit number N in the ADRC encoder is set depending on the subsampling rate in the subsampling encoder 3. The subsampling rate is determined for each block. In this embodiment, the digitization bit number is set at any one of the bit numbers (8, 7, 6, 5, 4, 3, 2, 1).

The subsampling encoder 3 will now be described with reference to FIG. 3 in which a digital video signal is shown to be applied to an input terminal 21 from the A/D converter 2. A series circuit of line delay circuits LD identified by reference numerals 22, 23, 24, 25 is connected to the input terminal 21. Also, sample delay circuits SD identified by the reference numerals 26 and 27 are connected in series with respect to the input terminal 21, and sample delay circuits 28 and 29 are serially coupled to the junction of the line delay circuits 22 and 23. Sample delay circuits 30, 31, 32 and 33 are connected in series to the junction between the line delay circuits 23 and 24, and sample delay circuits 34 and 35 are serially coupled to the junction between the line delay circuits 24 and 25. Moreover, sample delay circuits 36 and 37 are coupled in series to the output side of the line delay circuit 25. The line delay circuits 22, 23, 24, 25 each have a delay amount of one horizontal period, and the sample delay circuits 26, 27, 28, . . . , 37 each have a delay amount of one sampling period. Data of plural picture elements contained in a predetermined two-dimensional area of a television picture are simultaneously taken out by the line delay circuits 22 to 25 and the sample delay circuits 26 to 37.

Figure 4:
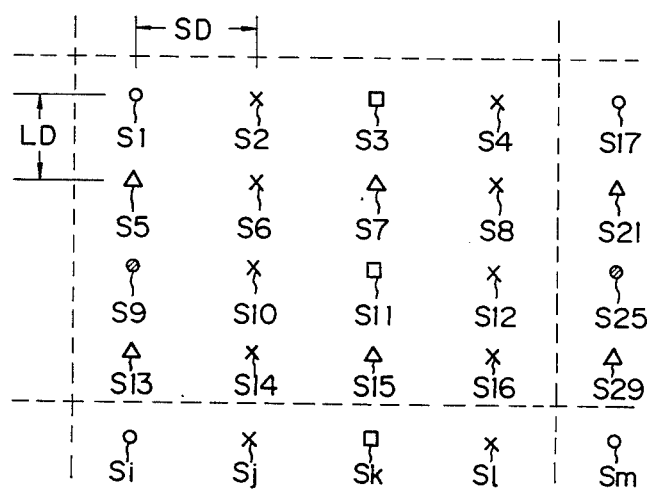
FIG. 4 is a schematic diagram for explaining various kinds of picture elements in a block.

A subsampling process according to this embodiment will now be explained with reference to FIG. 4 which shows a part of the area of the two-dimensional (field or frame) of an input digital video signal. As shown in FIG. 4, the interval between picture elements in the horizontal direction corresponds to a sampling period SD, and the interval between picture elements in the vertical direction corresponds to a line interval LD. The symbols (Δ, , □, ×, O) attached to the various picture elements represent different interpolation processings, respectively.

First, O represents an elementary picture element located every four lines and every four picture elements. One such elementary picture element out of the 16 picture elements in a block is necessarily transmitted without being subjected to the thinning-out process. Picture elements other than the elementary picture element are compared with an average value of two picture elements, as mentioned below. If a difference (predictive error) that exists between picture element data and the respective average value is equal to or smaller than a threshold value, then the thinning-out process is performed. Conversely, if the predictive error exceeds the threshold value, then transmission is performed.

1. Picture elements represented by Δ are compared with an average value of picture element data that appear at adjacent upper and lower lines which are 1LD apart. For instance, data for a picture element S5 is compared with an average of the data for the picture elements S1 and S9, respectively.

2. Picture elements represented by are compared with an average value of picture elements that appear at upper and lower lines which are separated by two (2) lines or by 2LD. For example, a picture element S9 is compared with an average value [½(S1+Si)].

3. Picture elements represented by □ are compared with an average value of picture elements lying apart by two picture elements in the right-handed and left-handed directions. For example, a picture element S11 is compared with an average [½(S9+S25)].

4. Picture elements represented by x are compared with an average value of picture elements adjacent thereto or separated by 1SD in the right-handed and left-handed directions. For example, a picture element S6 is compared with an average [½(S5+S7)].

Figure 3:
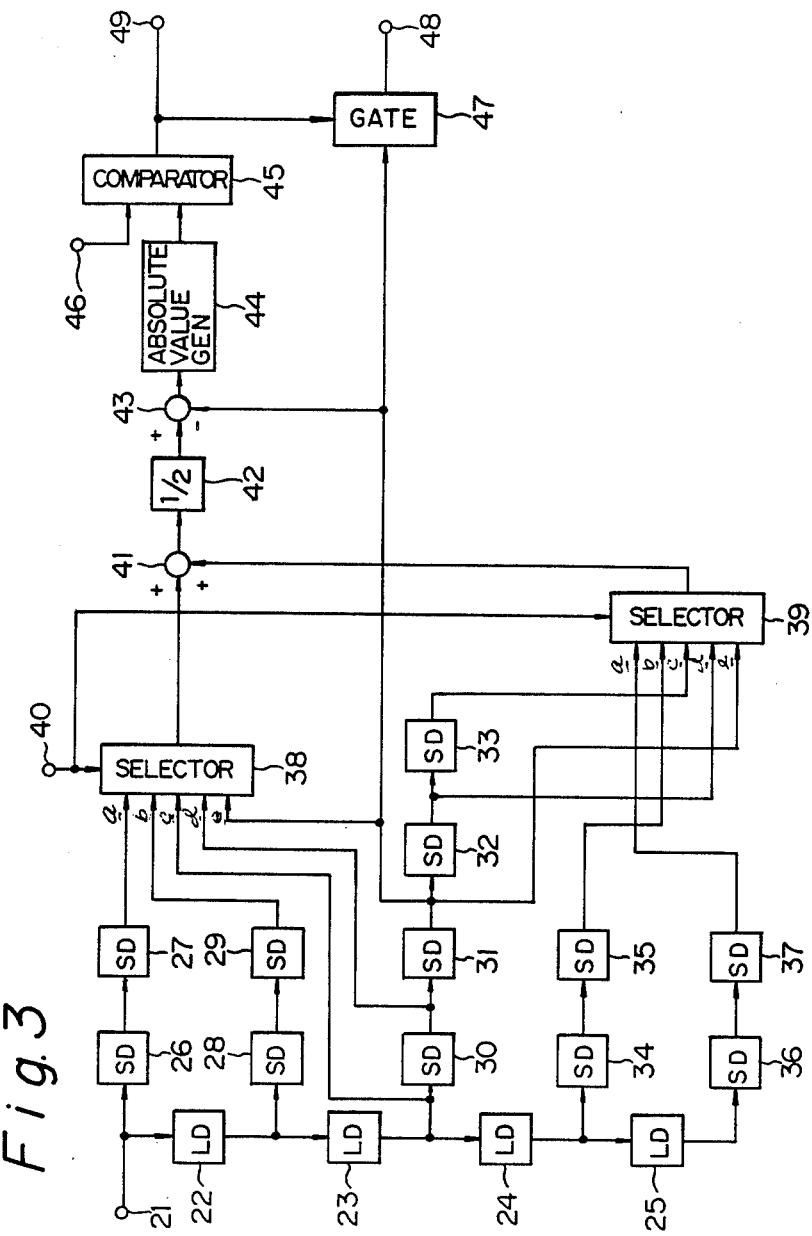
FIG. 3 is a block diagram for explaining a subsampling encoder of FIG. 1.

The output data of the sample delay circuit 31 in FIG. 3 is a subject picture element. The output data of the sample delay circuit 31 is supplied to fifth input terminals of two selectors 38 and 39, respectively, a subtracter 43 and a gate circuit 47. Each of the selectors 38 and 39 has five input terminals a, b, c, d and e. The selectors 38 and 39 sequentially and selectively transfer input data applied to the respective input terminals a-e to their output terminals in response to a selecting signal from a terminal 40 which is synchronized with a sampling clock.

The output data of the sample delay circuit 27 is supplied to the first input terminal a of the selector 38, and the output data of the sample delay circuit 37 is applied to the first input terminal a of the selector 39. As a result, when a subject picture element is a picture element indicated by , input data respectively supplied to the first input terminals a of the selectors 38 and 39 are selected.

The output data of the sample delay circuits 29 and 35 are supplied to the second input terminals b of the selectors 38 and 39, respectively. Consequently, in the case where a subject picture element is a picture element represented by Δ, input data supplied to the respective second input terminals of the selectors 38 and 39 are selected.

The output data of the line delay circuit 23 and the output data of the sample delay circuit 33 are supplied to the third input terminals c of the selectors 38 and 39, respectively. As a result, in the case where a subject picture element is the one represented by □, input data supplied to the respective third input terminals of the selectors 38 and 39 are selected.

The output data of the sample delay circuits 30 and 32 are supplied to fourth input terminals d of the selectors 38 and 39. Therefore, when a subject picture element is the one represented by x, input data supplied to the fourth input terminals of the selectors 38 and 39 are selected.

The output data (subject picture element) of the sample delay circuit 31 is supplied to fifth input terminals e of the selectors 38 and 39. Consequently, when a subject picture element is the elementary picture element represented by O, both of the selectors 38 and 39 select the elementary picture element.

The output data of the selectors 38 and 39 are fed to an adder 41, and the output signal of the adder 41 is fed to a ½ multiplication circuit 42. As a result, average value data of two picture elements respectively selected by the selectors 38 and 39 is generated from the ½ multiplication circuit 42. The average value data and data of the subject picture element from the sample delay circuit 31 are supplied to a subtracter 43, and difference data from the subtracter 43 is converted into absolute values at an absolute-value-generating circuit 44. The output data of the absolute-value-generating circuit 44 is supplied to a comparator 45 and compared with a threshold value from a terminal 46.

The output data of the absolute-value-generating circuit 44 represents a predictive error generated when an interpolation is provided as the average value of two picture elements. When the predictive error is equal to or less than a threshold value, a control code (1 bit) from the comparator 45 is "1", since it means that the picture element can be thinned out. On the other hand, when the predictive error exceeds the threshold value, the control code from the comparator 45 is brought to "0", because it means that the interpolation cannot be performed well on the reception side. The ON/OFF condition of a gate circuit 47 is controlled by this control code. When the control code is "0", the gate circuit 47 is turned ON so that original picture element data is supplied to an output terminal 48, whereas when the control code is "1", the gate circuit 47 is turned OFF so as to bar the original picture element data from the output terminal 48. Therefore, subsampled video data is provided at the terminal 48. In addition, the control code is produced at an output terminal 49 and provided together with subsampled video data as an output.

It will be appreciated that the predictive error of each elementary picture element Ois zero, which is surely less than the threshold value so that the gate circuit 47 is reliably turned ON to pass the elementary picture element data of each block to the output terminal 48 through the gate circuit 47.

As mentioned above, the subsampling is selectively effected depending on whether or not a predictive error is large for every picture element. More specifically, the transmission/thinning-out is adaptively controlled for every picture element as the smallest unit, rather than the block unit. Also, when a decision is made on whether the thinning-out should be performed on the basis of a predictive error, real data is always employed without using interpolation data. For this reason, repeated processing can be avoided to enable real-time processing. Needless to say, in the case of a small predictive error, a value of a picture element to be thinned out may be replaced by interpolation data, and this interpolation data may be employed when deciding the next predictive error.

As shown in FIG. 1, the picture element data and the control code taken out at the output terminals 48 and 49 are supplied to the block segmentation circuits 4 and 5, respectively. The block segmentation circuits 4 and 5 convert the sequence of the picture element data and the control code so as to have the order of blocks shown in FIG. 2. A clock signal with a block period is supplied to these block segmentation circuits 4 and 5 from a terminal 6. In a sampling pattern indicated in FIG. 4, broken lines show boundaries corresponding to blocks. As a result, as viewed from the standpoint of each block, the range of the thinning-out rates may extend from (1/16) which allows the transmission of only elementary picture element data to (16/16) which allows the transmission of data of all picture elements in a block.

The output data of the block segmentation circuit 4 is supplied to a maximum value and minimum value detector 7 and to a subtracter 10 through a delay circuit 8. The clock signal from the terminal 6 is supplied to the maximum value and minimum value detector 7, and a maximum value MAX and a minimum value MIN are detected every block.

The maximum value MAX and the minimum value MIN are supplied to a subtracter 9, so that a dynamic range DR represented by (MAX-MIN) is provided from the subtracter 9. The minimum value MIN is supplied to a subtracter 10, and picture element data from which the minimum value has been eliminated is produced from the subtracter 10. This picture element data is fed to a digitization circuit 12. A digitization step $\Delta$ is supplied to the digitization circuit 12 from a digitization step generator 11 and, in the circuit 12, data which is normalized by the elimination of the minimum value in the subtracter 10 is divided by the digitization step $\Delta$, and the result of the division is subjected to a processing for omission of fractions thereby to form coded data DT. The digitization step generator 11 and the digitization circuit 12 may each be composed of a ROM.

Figure 5:
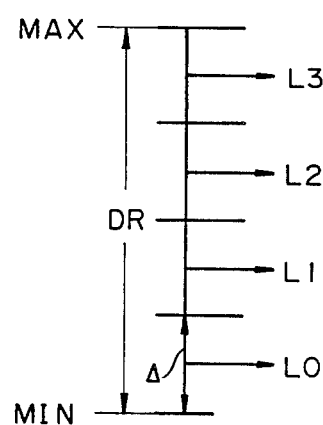
FIG. 5 is a schematic diagram for explaining a digitizing operation.

FIG. 5 shows a digitization operation in the case of the digitization bit number of 2 bits. By dividing the dynamic range DR by 4 ($2^2=4$), the digitization step $\Delta$ is formed. Data from which the minimum value has been eliminated is divided by the digitization step $\Delta$ and subjected to the processing for omission of fractions to provide a two-bit coded data DT. In FIG. 5, L0 to L3 indicate decoded levels (representative values) corresponding to coded data (00) (01) (10) (11), respectively.

FIG. 1 shows a bit number N is supplied to the digitization step generator 11 from a bit-number-determining circuit 18. This bit number N is determined according to the thinning-out rate in the subsampling encoder 3. For this purpose, the control code is converted into the order of blocks by the block segmentation circuit 5. The control code from the block segmentation circuit 5 is fed to a "1" separation circuit 15. As described before, each "1" of the control code indicates a thinning-out picture element.

The separated control code "1" is supplied to a counter 16. The counter 16 is reset by a clock signal from the terminal 6, and, consequently, the number of picture elements to be thinned out in each block is counted by the counter 16. The count value of the counter 16 is decoded at a decoder 17, and the output of the decoder 17 is applied to the bit-number-determining circuit 18. The decoder 17 is not always needed. For example, the bit-number-determining circuit 18 may be composed of a ROM which determines a digitization bit number on the basis of the number of picture elements to be thinned out, as counted by the counter 16.

An example of the correspondence between the number of picture elements to be thinned out and the digitization bit number N will be described below. In this example, the digitization of 1 bit to 8 bits is performed, and the total bit number of coded data DT generated in one block does not exceed 16 bits.

Number of picture elements to be thinned out: 15.

In the case where the number of transmitted picture elements is 1, it is not necessary to transmit the coded data DT, since N=8 or the maximum value MAX and the minimum value MIN are values of elementary picture element data themselves.

Number of picture elements to be thinned out: 14, 13.

In the case where the number of transmitted picture elements is 2 or 3, N=7.

Number of picture elements to be thinned out: 12.

In the case where the number of transmitted picture elements is 4, N=6.

Number of picture elements to be thinned out: 11.

In the case where the number of transmitted picture elements is 5, N=5.

Number of picture elements to be thinned out: 10.

In the case where the number of transmitted picture elements is 6, N=4.

Number of picture elements to be thinned out: 9, 8.

In the case where the number of transmitted picture elements is 7 or 8, N=3.

Number of picture elements to be thinned out: 7, 6, 5, 4, 3.

In the case where the number of transmitted picture elements is 9, 10, 11, 12 or 13, N=2.

Number of picture elements to be thinned out: 2, 1, 0.

In the case where the number of transmitted picture elements is 14, 15 or 16, N=1.

The digitization circuit 12 performs digitization by the bit number N determined by the bit-number-determining circuit 18. The control code from the block segmentation circuit 5, the digitization step $\Delta$ from the digitization step generator 11, the minimum value MIN from detector 7 and the coded data DT from circuit 12 are supplied to a frame segmentation circuit 13 and converted into transmission data of a frame structure. Encoding of error correction is done at the frame segmentation circuit 13 when necessary. Transmission data is derived at an output terminal 14 of the frame segmentation circuit 13.

According to the first embodiment, since no block distortion is generated and since both the subsampling, which matches a characteristic of a picture, and the ADRC encoder, which performs a compression in the level direction, are employed, the compression rate can be increased. Because this embodiment varies the digitization bit number of the ADRC encoder depending on the degree of the thinning-out of the subsampling, the control can be effected so that the generated data amount does not exceed the transmission capacity or so that the generated data amount is almost constant.

Figure 6:
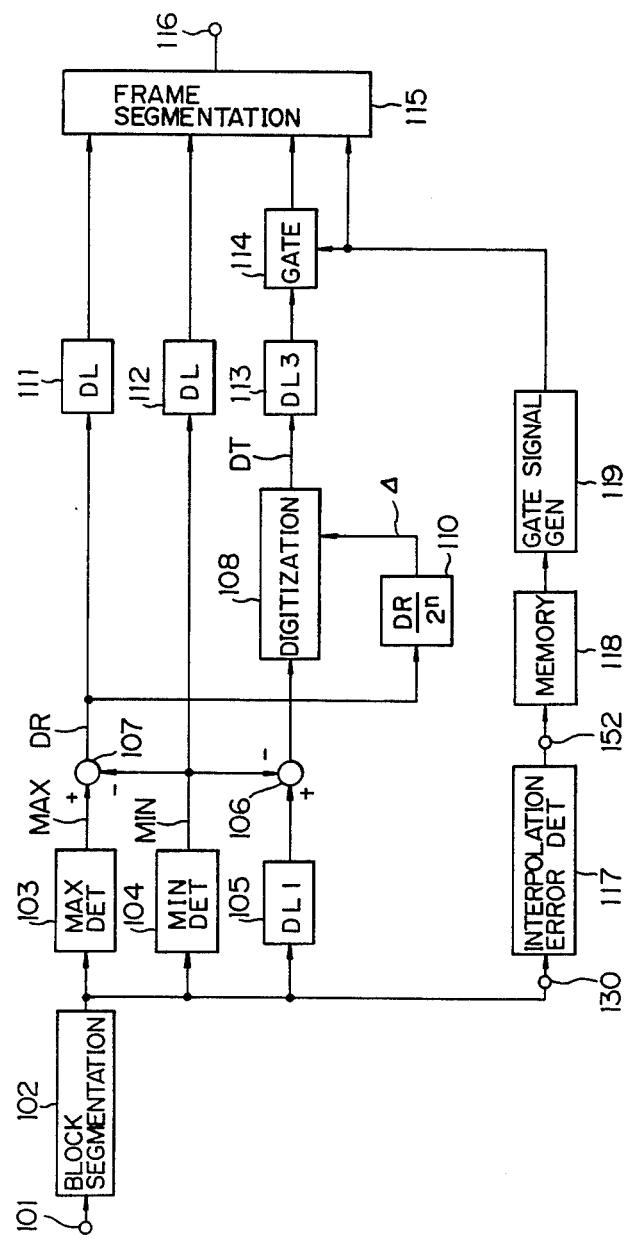
FIG. 6 is a block diagram of a second embodiment of the present invention.

A second embodiment of the present invention will now be described with reference to FIG. 6 in which a digital picture signal, for instance, a digital video signal is supplied to an input terminal 101. The digital video signal has a sampling frequency of 13.5 MHz, as an example, and the data for each picture element has eight bits.

Figure 7:
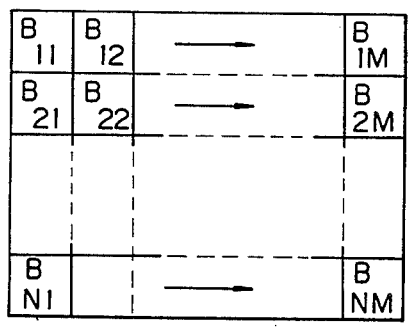
FIG. 7 is a schematic diagram for explaining operation of a block segmentation circuit included in the embodiment of FIG. 6.

The digital video signal is supplied to a block segmentation circuit 102. The block segmentation circuit 102 divides a picture of one field (or one frame) into a plurality of blocks B11, B12, . . . , BNM as shown in FIG. 7. For instance, each block has a structure as described above and shown in FIG. 2, so that each block contains the data for 16 picture elements. The sequence of data generated from the block segmentation circuit 102 is indicated by arrows showing the block order in FIG. 7. From each block, 16 picture elements are transmitted sequentially from a picture element on the left-handed side in a line L1 of FIG. 2 to those in lines L2, L3, L4.

The output data of the block segmentation circuit 102 is supplied to a maximum value detector 103 and a minimum value detector 104 and to a subtracter 106 through a delay circuit 105. A maximum value MAX and a minimum value MIN are detected for each block by the maximum value detector 103 and the minimum value detector 104.

The maximum value MAX and the minimum value MIN are supplied to a subtracter 107, so that a dynamic range DR represented by (MAX-MIN) is provided from the subtracter 107. The minimum value MIN is supplied to the subtracter 106, and picture element data from which the minimum value has been eliminated is produced from the subtracter 106. This picture element data is fed to a digitization circuit 108. A digitization step $\Delta$ is supplied to the digitization circuit 108 from a digitization step generator 110, the data, which is normalized by the elimination of the minimum value, is divided by the digitization step $\Delta$, and the result of the division is subjected to processing for omission of fractions thereby to form coded data DT. The coded data DT has a fixed bit number of 2 bits, for example. The digitization step generator 110 and the digitization circuit 108 may be composed not only of a division circuit but also of a ROM.

In the case where the bit number N is 2 bits as shown in FIG. 5, the dynamic range DR is divided into four level ranges by a digitization step $\Delta$ and the two-bit coded data DT is allocated depending on a value of data from which the minimum value is eliminated. A decoded level lies in the center of the width of the digitization step, for example.

The dynamic range DR and the minimum value MIN are supplied to a frame segmentation circuit 115 through delay circuits 111 and 112. The coded data DT from the digitization circuit 108 is supplied to a gate circuit 114 for subsampling through a delay circuit 113. A delay amount DL3 of the delay circuit 113 is set at (4LD+4SD). A gate signal, to be later described in detail, is supplied from a gate signal generator 119 to the gate circuit 114, and the coded data DT is selectively passed through the gate circuit 114. The output signal of the gate circuit 114 is supplied to the frame segmentation circuit 115. The gate signal is a bit map for indicating the transmission and thinning-out, and the bit map is also supplied to the frame segmentation circuit 115.

The dynamic range DR (8 bits), the minimum value MIN (8 bits), the subsampled coded data ($16 \times 2 \times \frac{1}{2}=16$ bits), and the bit map (16 bits) are converted into transmission data of a frame structure by the frame segmentation circuit 115. At the frame segmentation circuit 115, encoding of error correction is performed as needed. The transmission data is derived at an output terminal 116 of the frame segmentation circuit 115. In order to effect the transmission of arbitrary two-bit coded data within the dynamic range DR, both the minimum value MIN and the maximum value MAX are needed.

Gate signals for controlling the transmission of the coded data generated at the ADRC encoder and the thinned-out picture element data are produced depending on the magnitude of the interpolation error. The same interpolation method as is used for interpolating data of thinned-out picture elements on the reception side, is applied to the detection of the interpolation error.

A digital video signal converted into the sequence of blocks is supplied to an interpolation error detector 117 from the block segmentation circuit 102. The interpolation error detected at the interpolation error detector 117 is given to a memory 118, and the interpolation errors corresponding to each of 16 picture elements of one block are stored in the memory 118. In this case, since one elementary picture element is necessarily sent for every block, the detection and storage of interpolation errors with respect to other picture elements may be carried out. The interpolation error read out of the memory 118 is supplied to a gate signal generator 119.

The gate signal generator 119 specifies 8 picture elements in the increasing order of interpolation errors among the supplied 16 interpolation errors. The gate signal generator 119 generates a gate signal to transmit the coded data DT of these 8 specified picture elements through the gate circuit 114.

The predictive error of each elementary picture element becomes zero, which is the smallest predictive error. However, each elementary picture element is treated as exceptional in that the gate signal generator 119 is controlled so that the elementary picture element data can pass through the gate circuit 114.

Figure 8:
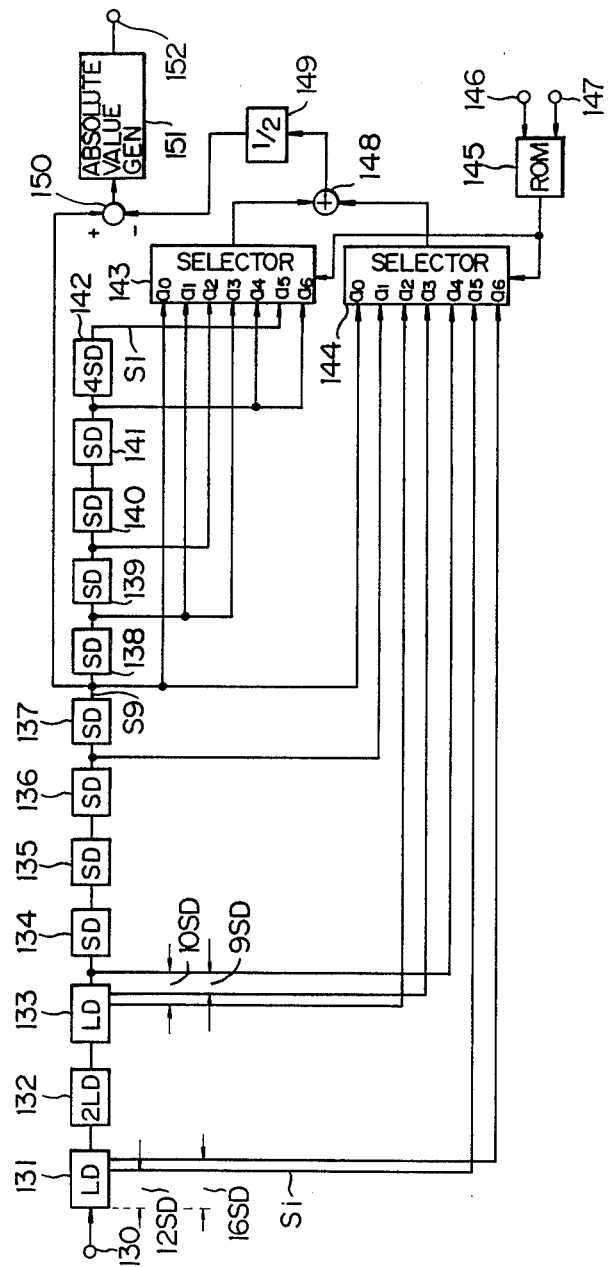
FIG. 8 is a block diagram of an interpolation error detector also included in the embodiment of FIG. 6.

An example of the interpolation error detector 117 is shown in FIG. 8. Delay circuits 131, 132, 133, 134, 135, 136, 137, 138, 139, 140, 141 and 142 are serially connected in sequence to an input terminal 130 supplied with the digital video signal from the block segmentation circuit 102. The delay circuits 131 and 133 are line delay circuits and have a delay time of one line indicated by LD. The delay circuit 132 has a delay time of 2LD. The delay circuits 134 to 141 have a delay time of a sampling period indicated by SD. The delay circuit 142 has a delay time of 4SD.

An arrangement of picture elements of one block is the same as the one shown in FIG. 4. The interpolation method is different for various picture elements, as mentioned above. In the earlier described embodiment, the digital video signal is a signal before block segmentation. However, in the present embodiment, since the picture element data, which has already been block segmented, is supplied, a time interval between each picture element is different from that in the foregoing description. Namely, in FIG. 4, a time interval between S1 and S5 is shown to be a delay amount LD of one line, while in this embodiment the time interval between S1 and S5 is 4SD.

Referring to FIG. 8, predetermined output signals of the delay circuits 131 and 142 are supplied to a first input terminal a0 to a seventh input terminal a6 of selectors 143 and 144, which are provided to take out two picture element data used for a calculation of an interpolation value. The selectors 143 and 144 are controlled by a selector control signal from a ROM 145. A sampling clock with a sampling period and a block clock with a block period which are in synchronism with the output signal of the block segmentation circuit 102 of FIG. 6 are applied to the ROM 145 from terminals 146 and 147, respectively.

Figure 9:
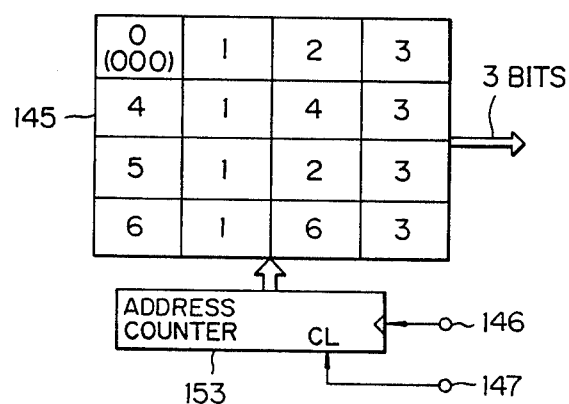
FIG. 9 is a block diagram of a ROM of FIG. 8.

FIG. 9 shows an example of the ROM 145, which is shown to be provided with an address counter 153. At various addresses of the ROM 145, three-bit selector control signals are stored corresponding to each of the positions of picture elements S1 to S16 of one block. However, for simplicity in FIG. 9, the three bit signals (000) (001) (010) . . . . (110) are indicated as 0, 1, 2, . . . . 6, respectively. When the selector control signal is 0, the selectors 143 and 144 selectively output data supplied to their input terminals a0. Similarly, the selectors 143 and 144 selectively output data applied to their input terminals a1, a2, a3, a4, a5 and a6 in response to their reception of the selector control signals 1, 2, 3, 4, 5 and 6, respectively.

As is understood from the selector control signals from the ROM 145 shown in FIG. 9, when each picture element in a block is a subject picture element, i.e., when data of the subject picture element is generated on the output side of the delay circuit 137, these selectors 143 and 144 selectively output data of two picture-elements respectively, for forming an interpolation value therefrom.

The two picture-element data taken out of the selectors 143 and 144 are given to an adder 148, the output signal of the adder 148 is supplied to a ½ multiplication circuit 149, and the interpolation value is output from the ½ multiplication circuit 149. This interpolation value is fed to a subtracter 150. Data of a subject picture element taken out of the junction of the delay circuits 137 and 138 is supplied as the other input signal of the subtracter 150. As a result, a difference between the real value and the interpolation value is produced as the output signal of the subtracter 150, and this difference is supplied to an absolute-value-generating circuit 151. An interpolation error from the absolute-value-generating circuit 151 is derived at input terminal 152. This interpolation error is supplied to the memory 118 as shown in FIG. 6, and interpolation errors of one block are stored at the memory 118.

When each of picture elements S1 to S16 indicated in FIG. 4 is a subject picture element, the data of two picture elements selected by the selectors 143 and 144, respectively, will be discussed below.

When the picture element S1 (FIG. 4) is a subject picture element, the selector control signal "0" (FIG. 9) is produced. The selectors 143 and 144 selectively output data of the subject picture elements which are supplied to input terminals a0 from the output side of the delay circuit 137. The picture element S1 is an elementary picture element, which is necessarily transmitted, so that the interpolation error is always zero therefor.

When the picture element S2 is a subject picture element, the selector control signal "1" is produced. Data of the picture element S1, which is the picture element one sampling period (1SD) prior to S2, is supplied to input terminal a1 of the selector 143 from the delay circuit 138, and data of the picture element S3, which is the picture element 1SD after the picture element S2, is supplied to the input terminal a1 of the selector 144 from the output side of the delay circuit 136. As a result, data of these two picture elements S1 and S3 are selected by the selectors 143 and 144, respectively.

If the picture element S3 is a subject picture element, then the selector control signal "2" is generated to select the inputs a2 of the selectors 143 and 144. Data of the picture element S1, which is the picture element 2SD prior to the picture element S3, has been supplied to the input terminal a2 of the selector 143 from the delay circuit 139, whereas, the data of picture element S17, which is after 14SD the picture element S3, has been supplied to the input terminal a2 of the selector 144 from an intermediate stage of the delay circuit 133. Namely, a delay amount of 4SD is generated by the delay circuits 134, 135, 136, 137, and, in the intermediate stage of the delay circuit 133, a delay amount of 10SD is generated on the output side of the delay circuit 133. As a result, data of these two picture elements S1 and S17 are selected by the selectors 143 and 144, respectively.

If the picture element S4 is a subject picture element, then the selector control signal "3" is produced to select the inputs a3 of the selectors 143 and 144. Data of the picture element S3, which is 1SD prior to the picture element S4, has been supplied from the delay circuit 138 to the input terminal a3 of the selector 143, whereas, the data of picture element S17, which is 13SD after the picture element S4, has been supplied to an input terminal a3 of the selector 144 from the intermediate stage of the delay circuit 133. Namely, a delay amount of 4SD is generated by the delay circuits 134, 135, 136 and 137. A delay amount of 9SD, with respect to the output side of the delay circuit 133, is produced in an intermediate stage of the delay circuit 133. Data of these two picture elements S3 and S17 are selected by the selectors 143 and 144, respectively.

If the picture element S5 is a subject picture element, then the selector control signal "4" is produced to select the inputs a4 of the selectors 143 and 144. Data of the picture element S1, which is a 4SD prior to the picture element S5, has been supplied to the input terminal a4 of the selector 143 from the delay circuit 141, whereas, data of picture element S9, which is 4SD after the picture element S5, has been supplied to the input terminal a4 of the selector 144 from the output side of the delay circuit 133. As a result, data of these two picture elements S1 and S9 are selected by the selectors 143 and 144, respectively.

If the picture element S6 is a subject picture element, then the selector control signal "1" is generated to select the inputs a1 of the selectors 143 and 144. Data of the picture element S5, which is 1SD prior to S6, has been supplied to the input terminal a1 of the selector 143 from the delay circuit 138, whereas the picture element S7, which is 1SD after the picture element S6, has been supplied to the input terminal a1 of the selector 144. Consequently, data of these two picture elements S5 and S7 are selected by the selectors 143 and 144, respectively.

If the picture element S7 is a subject picture element, then the selector control signal "4" is produced to select the input a4 of selectors 143 and 144. Data of the picture element S3, which is 4SD prior to S7, has been supplied to the input terminal a4 of the selector 143 from the delay circuit 141, whereas, the picture element S11, which is 4SD after the picture element S7, has been supplied to the input terminal a4 of the selector 144 from the output side of the delay circuit 133. Therefore, data of these two picture elements S3 and S11 are selected by the selectors 143 and 144, respectively.

If the picture element S8 is a subject picture element, then the selector control signal "3" is generated to select the inputs a3 of the selectors 143 and 144. Data of the picture element S7, which is 1SD prior to S8, has been supplied to an input terminal a3 of the selector 143 from the delay circuit 138, whereas, data of the picture element S21, which is 13SD after the picture element S8, has been supplied to the input terminal a3 of the selector 144 from the intermediate stage of the delay circuit 133. Consequently, data of these two picture elements S7 and S21 are selected by the selectors 143 and 144, respectively.

If the picture element S9 is a subject picture element, then the selector control signal "5" is generated to select the inputs a5. Data of the picture element S1, which is 8SD prior to S9, has been supplied to the input terminal a5 of the selector 143 from the delay circuit 142, whereas, the data of a picture element Si, which is (4LD−8SD) after S9, has been supplied to the input terminal a5 of the selector 144. In a block lying below the block shown in FIG. 4, the position of a picture element 4LD from the picture element S9 is a picture element (not shown) corresponding to the picture element S9. With respect to this picture element, the picture element Si is 8SD prior thereto. A delay amount of 4LD is generated by the delay circuits 131, 132, 133. Further, a delay amount of 4SD is produced by the delay circuits 134, 135, 136, 137. As a consequence, an output signal from a position −12SD with respect to the input side of the delay circuit 131 is supplied to the input terminal a5 of the selector 144. The selectors 143 and 144 select data of the picture elements S1 and Si, respectively.

If the picture element S10 is a subject picture element, then the selector control signal "1" is produced. Data of the picture element S9, which is 1SD prior to S10, has been supplied to the input terminal a1 of the selector 143 from the delay circuit 138, whereas, data of the picture element S11, which is 1SD after S10, has been supplied to the input terminal a1 of the selector 144. Therefore, data of these two picture elements S9 and S11 are selected by the selectors 143 and 144, respectively.

If the picture element S11 is a subject picture element, then the selector control signal "2" is generated. Data of the picture element S9, which is 2SD prior to the picture element S11, has been supplied to the input terminal a2 of the selector 143 from the delay circuit 139, whereas, data of the picture element S25, which is 14SD after the picture element S11, has been supplied to the input terminal a2 of the selector 144 from the intermediate stage of the delay circuit 133. As a result, data of these two picture elements S9 and S25 are selected by the selectors 143 and 144, respectively.

If the picture element S12 is a subject picture element, then the selector control signal "3" is produced. Data of the picture element S11, which is 1SD prior to S11, has been sent to the input terminal a3 of the selector 143 from the delay circuit 138, and data of the picture element S25, which is 13SD after the picture element S12, has been supplied to the input terminal a3 of the selector 144 from the intermediate stage of the delay circuit 133. As a consequence, data of these two picture elements S11 and S25 are selected by the selectors 143 and 144, respectively.

If the picture element S13 is a subject picture element, then the selector control signal "6" is produced. Data of the picture element S9, which is 4SD prior to S13, has been given to the input terminal a6 of the selector 143 from the delay circuit 141, whereas, data of the picture element Si, which is (4LD−12SD) after the picture element S13, has been supplied to the input terminal a6 of the selector 144. In the block lying below the block shown in FIG. 4, the position of a picture element 4LD after the picture element S13 is a picture element (not shown) corresponding to the picture element S13. With respect to that picture element, the picture element Si is 12SD prior thereto. A delay amount of 4LD is generated by the delay circuits 131, 132, 133 and a delay amount of 4SD is produced by the delay circuits 134, 135, 136, 137. As a result, an output signal which is −16SD with respect to the input side of the delay circuit 131 is supplied to the input terminal a6 of the selector 144. Data of these picture elements S9 and Si are selected by the selectors 143 and 144, respectively.

If the picture element S14 is a subject picture element, then the selector control signal "1" is generated. Data of the picture elements 13, which is 1SD prior to S14, has been supplied to the input terminal a1 of the selector 143 from the delay circuit 138, whereas, data of the picture element S15, which is 1SD after the picture element S14, has been given to the input terminal a1 of the selector 144. As a result, data of these two picture elements S13 and S15 are selected by the selectors 143 and 144, respectively.

If the picture element S15 is a subject picture element, then the selector control signal "6" is generated. Data of the picture element S11, which is 4SD prior to S15, has been supplied to the input terminal a6 of the selector 143 from the delay circuit 141, whereas data of the picture element Sk, which is (4LD−12SD) after the picture element S15, has been supplied to the input terminal a6 of the selector 144 from the position in the circuit which is −16SD with respect to the input side of the delay circuit 131. Data of these two picture elements S11 and Sk are selected by the selectors 143 and 144, respectively.

If the picture element S16 is a subject picture element, then the selector control signal "3" is produced. Data of the picture element S15, which is 1SD prior to S16, has been supplied to the input terminal a3 of the selector 143 from the delay circuit 138, whereas, data of the picture element S29, which is 13SD after the picture element S16, has been supplied to the input terminal a3 of the selector 144 from the intermediate stage of the delay circuit 133. Therefore, data of these two picture elements S15 and S29 are selected by the selectors 143 and 144, respectively.

The second embodiment described above with reference to FIGS. 6–9 permits the storage of block-segmented data in the buffer memory 118 and the read-out of data necessary for obtaining interpolation errors from the buffer memory.

In addition, for detection of interpolation errors, data with the minimum value eliminated, as obtained from the subtracter 106, or the coded data DT from the digitization circuit 108 may be employed. Further, a local decoder of the ADRC (adaptive dynamic range coding) may be provided to permit detection of the interpolation error from an ADRC-decoded value.

For interpolation, not only an average value of two picture elements but also an average value of data of four peripheral picture elements may be used.

According to the second embodiment, because both subsampling, which matches a characteristic of a picture, and the ADRC encoding which effects a compression in the level direction, are used, the compression rate can be increased. Since in the second embodiment, the digitization bit number is fixed and the thinning-out rate of the subsampling is fixed, the generated data amount can be controlled to be almost constant. As a result, it is efficient to apply the invention to a transmission path, such as a digital VTR, in which the generated data amount must not exceed a transmission capacity. Further, since the transmission and the thinning-out are alternately effected in dependence on the amplitude of an interpolation error, the quality of a reproduced picture can be kept excellent.

Figure 10:
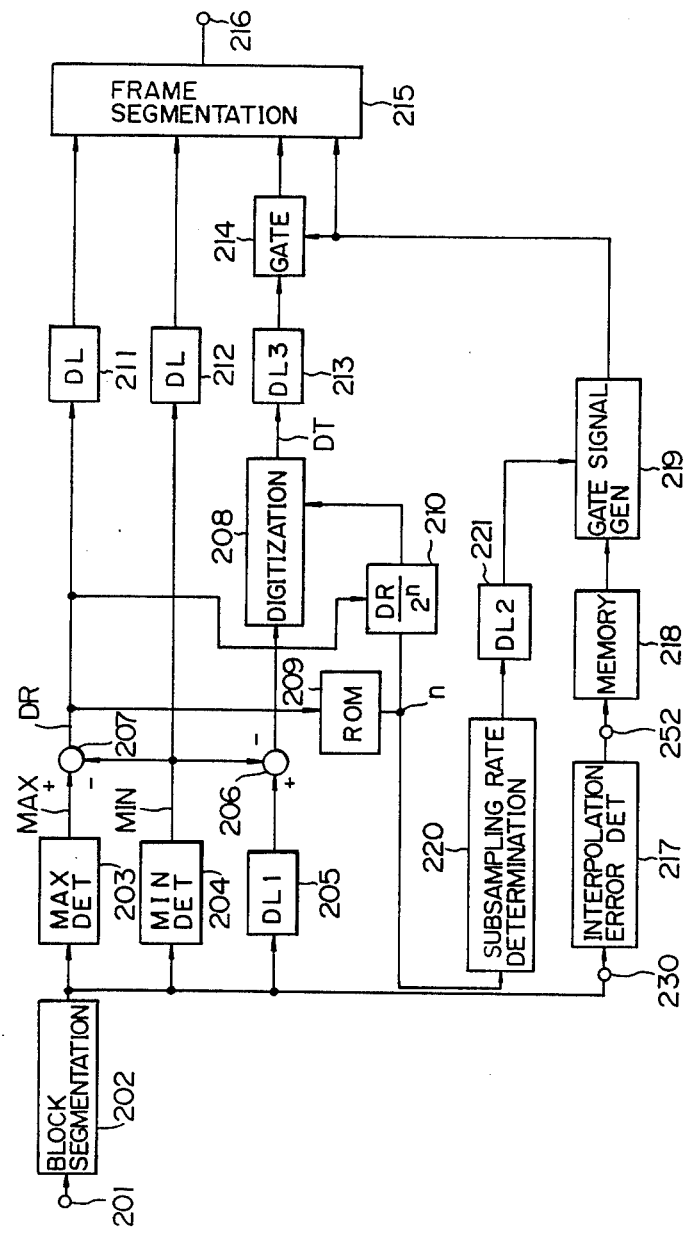
FIG. 10 is a block diagram of a third embodiment of the present invention.

A third embodiment of the present invention will now be described with reference to FIG. 10 in which a digital video signal is shown supplied to an input terminal 201. The digital video signal has a sampling frequency of 13.5 MHz, as an example, and the data for each picture element has eight bits.

The digital video signal is supplied from the terminal 201 to a block segmentation circuit 202. The block segmentation circuit 202 divides a picture of one field (or one frame) into a plurality of blocks B11, B12, ..., BNM as shown in FIG. 7. Each block has a (4×4) structure, as shown in FIG. 2, that is, each block contains the data of 16 picture elements. The sequence of data generated from the block segmentation circuit 202 is indicated by the arrows showing the block order in FIG. 7. In each block, the 16 picture elements are transmitted sequentially from a picture element on the left-handed side in a line L1 of FIG. 2 to those in lines L2, L3, L4.

The output data of the block segmentation circuit 202 is supplied to a maximum value detector 203 and a minimum value detector 204 and to a subtracter 206 through a delay circuit 205. A maximum value MAX and a minimum value MIN are detected every block by the maximum value detector 203 and the minimum value detector 204.

The maximum value MAX and the minimum value MIN are supplied to a subtracter 207, so that a dynamic range DR represented by (MAX-MIN) is provided from the subtracter 207. The minimum value MIN is supplied to the subtracter 206, and picture element data from which the minimum value has been eliminated is produced from the subtracter 206. This picture element data is fed to a digitization circuit 208. A digitization step $\Delta n$ is supplied to the digitization circuit 208 from a digitization step generator 210. Data from the subtracter 206 which is normalized by the elimination of the minimum value is divided in the circuit 208 by the digitization step $\Delta n$, and the result of the division is subjected to processing for omission of fractions thereby to form coded data DT.

The coded data DT has a variable bit number of 1, 2, 3 or 4 bits, for example. This bit number is determined depending on a dynamic range DR. The dynamic range DR is supplied to a ROM 209, and data with a bit number n is generated from the ROM 209. The bit number n is supplied to the digitization step generator 210 to set a digitization step $\Delta n$. The digitization step generator 210 and the digitization circuit 208 may be composed not only of a division circuit but also of a ROM.

The larger the dynamic range DR, the larger the bit number n. For instance, (n=1) is established when the dynamic range DR is small, and the digitization is performed by a digitization step indicated $\Delta 1$. When the dynamic range DR is larger, (n=2) is established to perform the digitization step indicated by $\Delta 2$. A non-linear digitization of ($\Delta 1 \neq \Delta 2$) is done. A table for showing the relationship between the dynamic range DR and the bit number n is stored into the ROM 209. A decoded level lies in the center of the width of the digitization step $\Delta n$, for example.

The dynamic range DR and the minimum value MIN are supplied to a frame segmentation circuit 215 through delay circuits 211 and 212. The coded data DT from the digitization circuit 208 is given to a gate circuit 214 for subsampling through a delay circuit 213. A delay amount DL3 of the delay circuit 213 is set at (4LD+4SD). A gate signal formed by a gate signal generator 219, as described later is fed to the gate circuit 214, and the coded data DT is selectively passed through the gate circuit 214. The output signal of the gate circuit 214 is supplied to the frame segmentation circuit 215. The gate signal is a bit map for indicating the transmission and thinning-out, and the bit map is also supplied to the frame segmentation circuit 215.

The dynamic range DR (8 bits), the minimum value MIN (8 bits), the subsampled coded data (15 or 16 bits), and bit map (16 bits) are converted into transmission data of a frame structure by the frame segmentation circuit 215. At the frame segmentation circuit 215, encoding of error correction is also effected as needed. The transmission data is taken out at an output terminal 216 of the frame segmentation circuit 215. In order to provide transmission of arbitrary two-bit coded data within the dynamic range DR, the minimum value MIN and the maximum value MAX are needed.

Gate signals for controlling the transmission of the coded data generated at the ADRC encoder and the thinned-out picture element data are produced depending on the digitization bit number n and the magnitude of the interpolation error. The same interpolation method, as used for interpolating data of thinned-out picture elements on the reception side, is applied to the detection of the interpolation error.

A digital video signal converted into the sequence of blocks is supplied to an interpolation error detector 217 from the block segmentation circuit 202. The interpolation error detected at the interpolation error detector 217 is applied to a memory 218, and the interpolation errors corresponding to the 16 picture elements of one block are stored in the memory 218. In this case, since one elementary picture element is necessarily transmitted for every block, the detection and storage of interpolation errors with respect to other picture elements may be carried out. The interpolation error read out of the memory 218 is supplied to a gate signal generator 219.

Information on the thinning-out rate is generated at a subsampling rate determining circuit 220 and is applied to the gate signal generator 219 through a delay circuit 221. The total time delay comprised of the delay DL2 of the delay circuit 221 and the delay DL1 of the above-mentioned delay circuit 205 is selected to be (4LD−8SD). The subsampling-rate-determining circuit 220 determines the thinning-out rate on the basis of the bit number n. The thinning-out rate (the number of transmission picture elements ÷ the number of picture elements of one block) in the case of (n=1) is selected to be 1; the thinning-out rate in the case of (n=2) is selected to be ½; the thinning-out rate in the case of (n=3) is selected to be ⅓; and the thinning-out rate in the case of (n=4) is selected to be ¼. In this example, since the number of picture elements of one block is 16, the number of transmission picture elements is made to be 5 in the case of the thinning-out rate of ⅓. As a result, the total of the bit number of coded data generated in one block is almost constant (15 bits or 16 bits).

The gate signal generator 219 generates a gate signal so that picture element data of the number specified by the above-described thinning-out rate, and which are sequentially selected in the increasing order of interpolation errors, passes the gate circuit 214. In the case of the thinning-out rate of 1, all picture element data in a block is transmitted through the gate circuit 214.

In this case, the predictive error of each elementary picture element O becomes zero, which is the smallest predictive error. However, this elementary picture element is treated exceptionally in that the gate signal generator 219 is controlled so that the elementary picture element data passes preferentially through the gate circuit 214.

The interpolation error detector 217 might have the same construction as the one shown in FIG. 8 and its operation is as mentioned above.

According to the third embodiment, because both the subsampling which matches a characteristic of a picture and the ADRC encoder, which performs a compression in the level direction, are used, the compression rate can be increased. Since this embodiment varies the degree of the thinning-out of the subsampling depending on the digitization bit number of the ADRC encoder, the control can be effected so that the generated data amount is near constant. As a result, it is efficient to apply this embodiment to a transmission path such as a digital VTR, in which the generated amount is required to not exceed a transmission capacity.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

I claim:

1. A highly efficient coding apparatus for coding digital video data in a format composed of blocks of digital video data representing plural picture elements and allowing compression of the video data, comprising:

means for receiving the digital video data represented by respective picture element data of a predetermined number of bits, means constituting at least one of said plural picture elements for each of said blocks as an elementary picture element while the remaining picture elements of the respective block constitute subject picture elements thereof, means for predicting values of data representing said subject picture elements, means for detecting predictive errors of the predicted values relative to the real values of the subject picture element data, means for generating flag data when each said predictive error is greater than a threshold value, Gating means responsive to said flag data for gating said elementary picture element data and the subject picture element data for which the respective predictive errors are greater then the threshold value, means for detecting maximum and minimum values of the picture element data in each of said blocks, means for generating dynamic range information for each said block from said maximum and minimum values for the respective block, means for generating modified digital video data for each said block as the difference between each of the output data of said gating means and one of said maximum and minimum values for said respective block, means for encoding modified digital video data with a variable digitized bit number determined by said flag data for said respective block so as to provide coded data of bit length which is varied so as to maintain substantially constant the amount of said coded data for each said respective block, and transmitting means for transmitting at least said coded data and said flag data.

2. A highly efficient coding apparatus for coding digital video data in a format composed of blocks of digital video data of a predetermined original digitized bit number representing plural picture elements and allowing compression of the video data, comprising:

detecting means for detecting maximum and minimum values of the digital video data representing the plural picture elements in each of said blocks, Dynamic Range Generating means for generating dynamic range information for each said block from said maximum and minimum values for the respective block, Modified Digital Video Generating means for generating modified digital video data for each said block as the difference between the digital video data representing each of said picture elements and one of said maximum and minimum values for said respective block, means for encoding said modified digital video data with a fixed digitized bit number less than said original digitized bit number so as to provide coded data of reduced bit length, means constituting at least one of said plural picture elements of each of said blocks as an elementary picture element of the respective block while the remaining picture elements thereof constitute subject picture elements, means for predicting values of data representing said subject picture elements, means for detecting predictive errors of the predicted values relative to the real values of the subject picture element data, Selecting means for selecting a fixed number of subject picture elements for each said block which have predictive errors greater than those of the remaining subject picture elements in said block and for generating selection data identifying the selected subject picture elements, and transmitting means for transmitting at least said coded data of said elementary picture elements and of selected subject picture elements and said selection data.

3. A highly efficient coding apparatus for coding digital video data in a format composed of blocks of digital video data presenting plural picture elements and allowing compression of the video data, comprising:

detecting means for detecting maximum and minimum values of the digital video data representing plural picture elements in each of said blocks, means for generating dynamic range information for each said block from said maximum and minimum values for the respective block, means for generating modified digital video data for each said block as the difference between the digital video data representing each of said picture elements and one of said maximum and minimum values for the respective block, means for encoding said modified digital video data with a variable digitized bit number determined by said dynamic range information so as to provide coded data of variable bit length.

means constituting at least one of said plural picture elements of each of said blocks as an elementary picture element for the respective block while the remaining picture elements of said respective block constitute subject picture elements thereof, means for predicting values of data representing said subject picture elements, means for detecting predictive errors of the predicted values relative to the real values of the subject picture element data, Selecting means for selecting a number of said subject picture elements of each said block having predictive errors greater than those of the remaining subject picture elements in the respective block, said number of the selected subject picture elements being dependent on said digitized bit number, said selecting means generating selection data identifying said selected subject picture elements, and transmitting means for transmitting the coded data of said elementary picture elements and of said selected subject picture elements and said selection data.

4. A highly efficient coding apparatus for coding original digital video data in a format composed of blocks of digital video data representing plural picture elements and allowing compression of the video data, comprising:

encoding means supplied with said digital video data for compression encoding the same with a fixed data amount less than that of the original digital video data so as to provide encoded data representing plural samples in each said block, means for predicting values of respective ones of said plural samples, means for detecting predictive errors of the predicted values relative to the real values of the respective samples, Sample Selecting means for selecting a fixed number of the samples of a block which have predictive errors greater than those of the remaining samples in said block and for generating selection data identifying selected samples, and transmitting means for transmitting at least the coded data of said selected samples and said selection data.

5. A highly efficient coding apparatus for coding digital video data in a format composed of blocks of digital video data representing plural picture elements and allowing compression of the video data, comprising:

encoding means supplied with said digital video data for encoding the same with a variable data amount determined by a characteristic of each said block so as to provide encoded data representing plural samples in each said block, means for predicting values of respective ones of said plural samples, means for detecting predictive errors of the predicted values relative to the real values of the respective samples, means for selecting samples of each said block having predictive errors which are greater than those of remaining samples in said block, the number of the selected samples being determined by said variable data amount, and said selecting means generating selection data identifying the selected samples, and amount, and said selecting means generating selection data identifying the selected samples, and transmitting means for transmitting at least the encoded data of said selected samples and said selection data.

* * * * *